United States Patent [19]

Farmer

[11] E Re. 28,528

[45] Reissued Aug. 26, 1975

[54] PATTERNING MECHANISM FOR CIRCULAR KNITTING MACHINES

[76] Inventor: Ernest L. Farmer, Leicester, England

[22] Filed: Jan. 21, 1974

[21] Appl. No.: 435,038

Related U.S. Patent Documents

Reissue of:

[64] Patent No.: 3,315,494
Issued: Apr. 25, 1967
Appl. No.: 423,982
Filed: Jan. 7, 1965

[52] U.S. Cl. ..... 66/50 B
[51] Int. Cl.[2] ..... D04B 9/00
[58] Field of Search ..... 66/50, 50 B, 154, 57

[56] References Cited

UNITED STATES PATENTS

| | | | |
|---|---|---|---|
| 2,262,213 | 11/1941 | Tandler | 66/50 B |
| 2,423,989 | 7/1947 | Manger et al. | 66/50 B |
| 3,077,756 | 2/1963 | Widdowson et al. | 66/50 B |
| 3,097,510 | 7/1963 | Brown | 66/50 B |
| 3,234,760 | 2/1966 | Azzolori | 66/57 |

FOREIGN PATENTS OR APPLICATIONS

| | | | |
|---|---|---|---|
| 366,325 | 2/1932 | United Kingdom | 66/50 B |

*Primary Examiner*—Ronald Feldbaum
*Attorney, Agent, or Firm*—Robert E. Burns; Emmanuel J. Lobato; Bruce L. Adams

[57] ABSTRACT

*Needle selecting mechanism of a circular knitting machine includes individually movable control elements mounted in the grooves of a needle cylinder and provided with control butts. The elements are movable lengthwise and the portions of the elements carrying the butts are movable radially so that the butts are selectively presented to or caused to miss actuating cam means. Pressers arranged in the same grooves in front of the control elements have patterning butts, one on each presser engageable with stacked patterning discs to press the pressers and hence the corresponding control elements radially inwards. Means is provided for shifting the pressers longitudinally at a height selection station to present their patterning butts to predetermined discs. The pressers are further provided with height locating butts which are engageable with a locking ring to lock the pressers against longitudinal movement except at the height selection station.*

18 Claims, 12 Drawing Figures

PATTERNING MECHANISM FOR CIRCULAR KNITTING MACHINES

Figure 1:
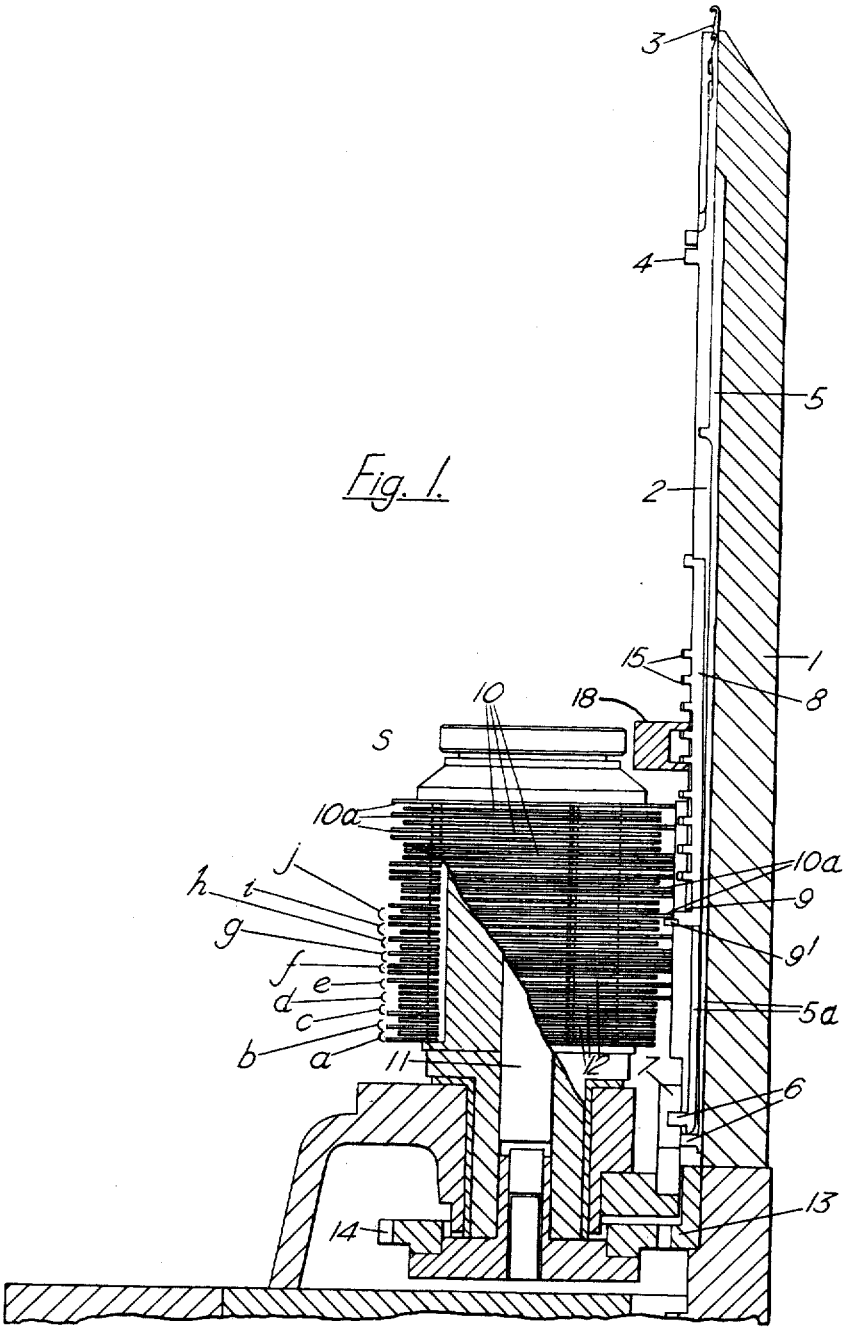

Matter enclosed in heavy brackets [ ] appears in the original patent but forms no part of this reissue specification; matter printed in italics indicates the additions made by reissue.

---

This invention relates to patterning mechanisms for circular knitting machines, and concerns such mechanism of the class which has a selective action upon stitch forming or other elements of the machine requiring to be controlled or influenced for producing patterning effects in knitted fabric.

Thus, although the elements of the machine to be controlled or influenced by the patterning mechanism of this invention will usually be either independent slidable needles, or associated jacks or sliders, there is no limitation in this respect.

When the elements concerned are needless in a cylinder, the purpose of the mechanism is to determine the manner in which predetermined needles operate at relevant stations at desired times, e.g., as to whether such needles miss, tuck, clear and knit, are operated for transfer, and so on, according to patterning requirements.

The invention, moreover, has reference exclusively to patterning mechanism of a previously proposed form comprising, in combination, elements mounted movably in tricks or grooves in a cylindrical rotary bed of the machine, said elements having butts and, in addition to being selectively movable lengthwise and controlled by cams acting on the butts for producing pattern effects in knitted fabric, being also capable of movement radially inwards into their tricks or grooves towards the axis of the cylindrical bed so as to initiate such selective actuation, pressers arranged in the same tricks or grooves as, and in front of, the aforesaid elements to be controlled or influenced, there being one presser to each element, and the stems of the pressers being furnnished with patterning butts, and a pile or stack of co-adjacent rotary members, driven in timed relation with the cylindrical bed and having peripheral formations for action on the patterning butts for the purpose of pressing selected pressers, and hence also the corresponding elements, radially inwards into their tricks or grooves.

In a patterning mechanism of this form, the elements to be controlled or influenced are often in the form of needle-actuating jacks placed beneath needles, these jacks being either themselves arranged to rock radially inwardly and outwardly or being provided with downwardly extending springy extensions which, whenever permitted to do so, move outwardly under the spring influence but are capable of being pressed back into the relevant tricks or grooves by the corresponding pressers. In these cases, whenever a needle-actuating jack, or its springy extension, moves outwardly a lower butt on the jack engages with a jack-raising cam whereby the jack and hence also the corresponding needle is raised. On the other hand, a jack or jack extension selectively pressed inwards to miss the cam remains down. The invention is not, however, limited in these respects, as, for instance, needles themselves, or needle-actuating sliders, may be the elements to be controlled or influenced.

Also, in a patterning mechanism of the form herein referred to, the rotary members usually consist of thin discs cut at their peripheries to form pre-arranged radially extending teeth: for the sake of convenience in the following further description such rotary members will accordingly be referred to as "discs"—again without any limitation.

Now heretofore, in a pattening mechanism of the form referred to, the pressers have usually been permanently maintained at a set level with a full complement of patterning butts presented at different heights opposite to the peripheries of discs in the rotary pile or stack, and the said discs have been supported by carriers which are movable individually towards and away from the pressers whereby the discs are rendered operative and inoperative, associated controlling means being provided for moving the carriers in a predetermined manner whereby the corresponding discs are brought into and out of action, according to patterning requirements.

The object of the present invention is to provide a much simplified patterning mechanism of the form concerned, one aim being to obviate the necessity for disc carriers and control mechanism therefor.

In the improved patterning mechanism constituting the present invention, all of the rotary discs in the pile or stack are fixed so far as any movements thereof towards and away from the pressers are concerned, and each such presser is furnished with only one patterning butt for engagement by peripheral formations on the discs, variable presser moving means being included in the mechanism for sequentially shifting the pressers longitudinally upwards and downwards to dispose their single patterning butts opposite to the peripheries of predetermined discs.

In other words, with the machine running, the rotary discs are all permanently in action, i.e. operative, so that immediately a presser is raised or lowered to dispose its single patterning butt at a height coincident with a plane containing a rotary disc, a peripheral formation on the latter will act on the butt and push the presser, and hence also the associated element, back into its trick or groove with the result already described herein.

Advantageously, the arrangement of the improved mechanism may be such that successive pressers are moved seriatim first longitudinally upwards in steps of predetermined equal extents, to dispose their single patterning butts opposite to the peripheries of successively higher rotary discs in the pile or stack, whereupon such pressers are similarly moved longitudinally downwards in like steps to dispose the said butts opposite to successively lower discs, or vice versa.

In a single case included within the broad scope of the invention, each presser may be incrementally moved upwards at desired times in a strick sequence so that its single patterning butt is acted upon first by the lowest rotary disc in the pile or stack, then by the next higher disc, and so on disc by disc to the top disc in the pile or stack, after which the presser is reversed in direction and incrementally moved downwards so that its patterning butt is acted upon by successively lower discs in turn.

But in an arrangement where the same pattern is to be continuously repeated, then each presser may conveniently be moved in such increments that between upward movements thereof each to the same extent its single patterning butt will be acted upon by alternate rotary discs, whereas between intermittent downward movements of the same presser, the said patterning butt will be acted upon by the intervening rotary disc in the pile or stack, and so on.

Several other arrangements of the rotary discs and modes of operation of the variable presser moving means are, of course, possible, and some of these will be hereinafter specially described.

As will be appreciated, the pressers are moved either up or down to the extent of one step or increment at a time at a station in advance of an element selecting station at which a pile or stack of rotary discs is provided. There may be two or more of such presser raising and lowering stations suitably spaced apart around a machine and also two or more element selecting stations at which pressers are pressed back into their tricks or grooves selectively by peripheral formations on rotary discs.

Figures 2, 4, 5:
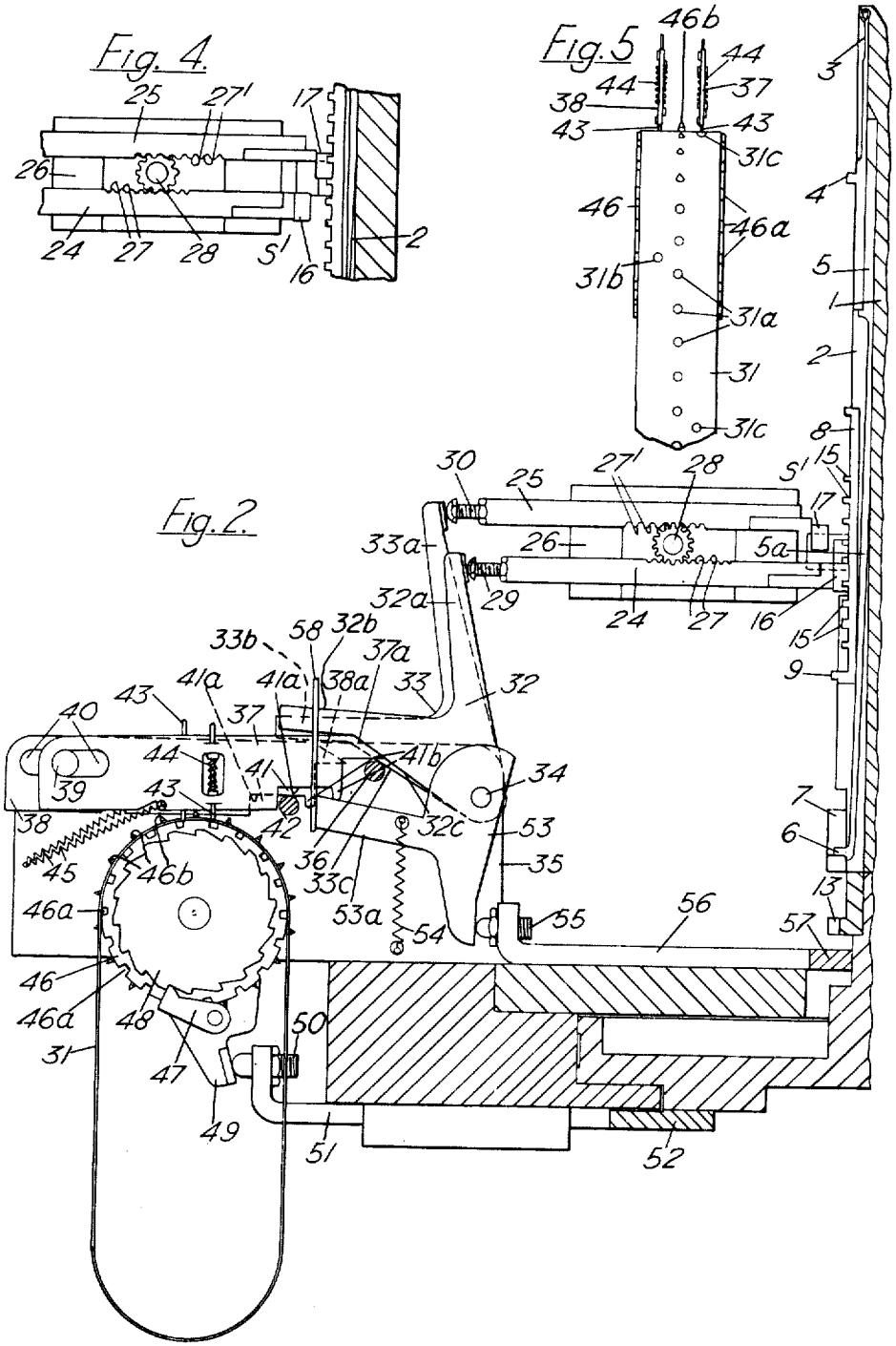
Figure 3:
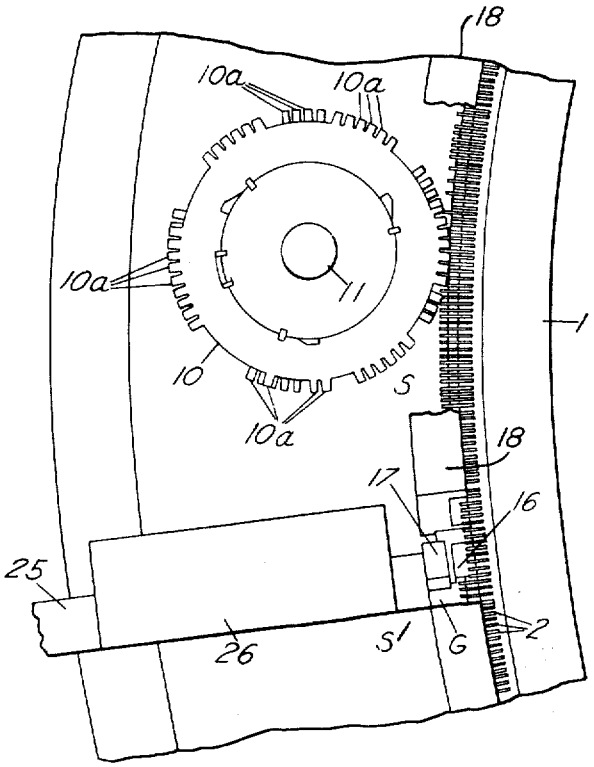
Figure 6:
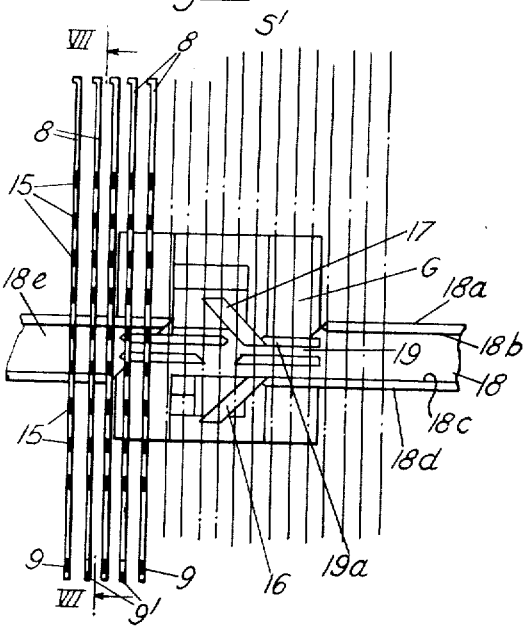
Figure 7:
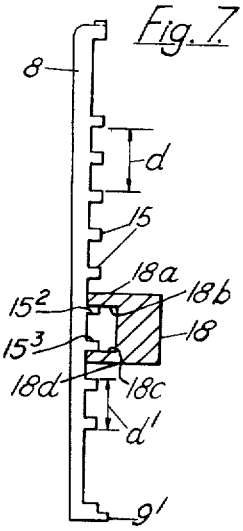
Figure 8:
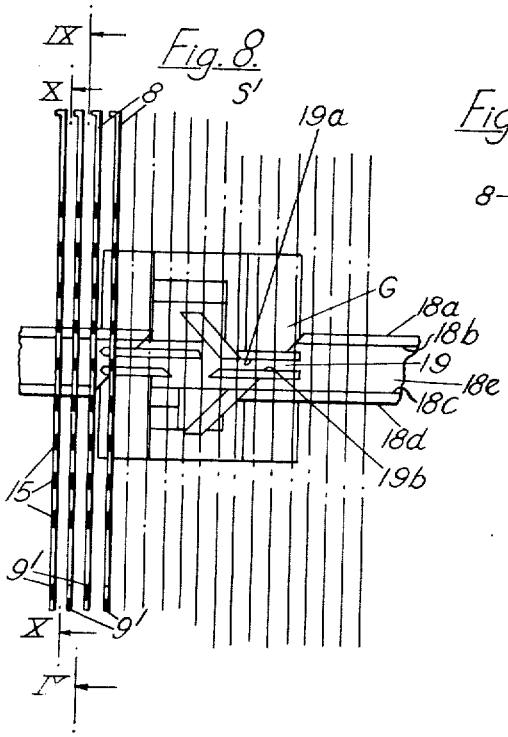
Figure 9:
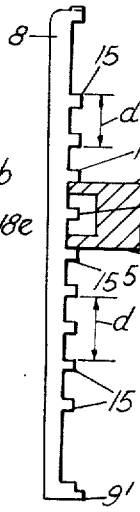
Figure 10:
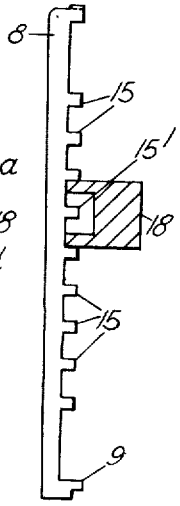
Figure 11:
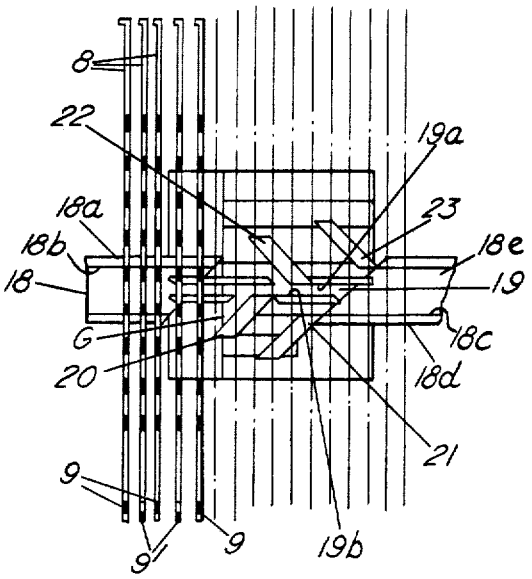
Figure 12:
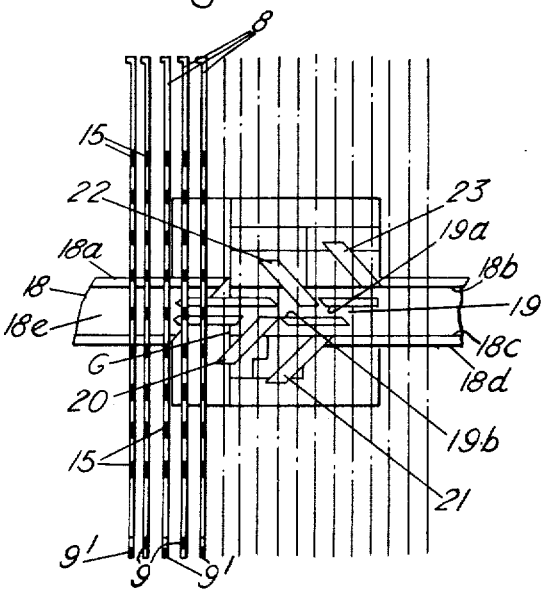

In order that the invention may be more clearly understood and readily carried into practical effect, specific arrangements of the improved patterning mechanism will now be described with reference to the accompanying drawings, wherein, FIG. 1 is a vertical sectional view of so much of a circular knitting machine as is necessary to show an element selecting station at which a pile or stack of rotary discs is provided, FIG. 2 is a similar vertical sectional view of the said machine showing a presser raising and lowering station, such as is provided in advance of an element selecting station, and also the means employed for selectively projecting and retracting the presser raising and depressor cams into and out of their operative positions respectively, FIG. 3 is a fragmentary plan view illustrating a presser raising and lowering station and a companion element selecting station, FIG. 4 is a detail elevational view, partly in section, depicting the carrier slides of a pair of presser raising and lower cams and the manner in which these slides are intercoupled, FIG. 5 is a detail view showing a portion of the intermittently movable control band and the associated levers included in the connections through the medium of which the said carrier slides are actuated, FIG. 6 is a diagrammatic representation of a few of the pressers, with their height selection butts shown in relation both to presser raising and lowering cams and also to a fixed guide ring or annulus the form and purpose of which is to be hereinafter described, FIG. 7 is a vertical sectional view, taken on the line VII—VII of FIG. 6, showing one of the pressers and the guide ring or annulus, FIG. 8 is a view similar to FIG. 6 but with the presser lowering cam instead of the presser raising cam shown operative, FIGS. 9 and 10 are two vertical sections taken on the lines IX—IX and X—X of FIG. 8 respectively, and FIGS. 11 and 12 are two views, similar to FIGS. 6 and 8 respectively, showing a modified arrangement of presser raising and lowering cams suitable for producing a mirror repeated pattern, as will be hereinafter described.

Like parts are designed by similar reference characters throughout the drawings.

Referring to FIGS. 1 and 2, the reference numeral 1 indicates a needle cylinder having formed therein a circular series of tricks or grooves such as 2 in each of which is provided an independently operable knitting needle 3 of the latch type. Each needle is furnished with an operating butt 4. Provided at the back of each knitting needle, in the same trick or groove 2, is a needle-actuating jack 5 having a slender downwardly directed extension 5a of a springy nature. The lower extremity of the said extension is provided with a control butt 6. Normally, i.e. whenever permitted to do so, the extension 5a springs into its outer position with its control butt 6 so disposed as to be acted upon by a jack raising cam 7 by means of which the jack 5 and the corresponding needle 3 are raised. If, however, the springy extension 5a of any jack is pressed inwardly into the relevant trick or groove 2, the corresponding control butt 6 will be moved radially inwards to a position in which it will miss the cam 7; as a consequence, the jack 5 and its needle 3 will be "selected" to remain down. Thus, the needle-actuating jacks 5, in addition to being selectively movable lengthwise and controlled by cams such as 7, are also capable of movement radially inwards into their tricks or grooves 2 towards the axis of the cylinder 1 so as to determine needle selection. Arranged in the same trick or groove 2 as, and in front of, each downwardly directed springy jack extension 5a is a presser 8 the lower end of the straight stem of which is furnished with a patterning butt 9 or 9'. The reason for the single patterning butts 9 being at a higher height than the single patterning butts 9' will be hereinafter fully explained.

Adjacent to the pressers 8, at a jack (and hence also a needle) selecting station S is a pile or stack of thin rotary discs 10 which are cut at their peripheries to form prearranged radially extending teeth 10a. The superimposed rotary discs 10 are, as illustrated in FIG. 1, mounted together upon a common vertical spindle 11 with spacers 12 therebetween, and the complete pile or stack constituting a unitary assemblage is adapted to be driven from and at the same peripheral speed as the tricked or grooved needle cylinder 1 in which the jacks 5 and the pressers 8 are accommodated. Preferably, and as shown, the said needle cylinder is of substantially larger diameter than that of the discs 10 whereby each disc revolves several times to control or influence either all, or a predetermined group of, the needle 3. Thus, as will be seen, a gear 13 revolving with the cylinder 1 is arranged in mesh with a pinion 14 secured to the lower end of the spindle 11.

In accordance with the characteristic feature of the present invention, all of the discs 10 in the rotary pile or stack are fixed so far as any radial movement thereof towards and away from the pressers 8 are concerned, and each such presser is furnished with only one patterning butt (9 or 9') for engagement by peripheral teeth 10a, variable presser moving means, presently to be described, being provided for sequentially shifting the pressers upwards and downwards to dispose their single patterning butts opposite to the peripheries of predetermined discs.

But after any presser 8 has been longitudinally shifted up or down to the extent of one step, at a presser raising and lowering station S', the said presser must be strictly maintained at the height to which it has thereby been moved until next required to be shifted up or down either at the same, or at the next, pressure raising and lowering station, as the case may be. The improved patterning mechanism accordingly essentially includes means of any suitable character for supporting pressers and locking them against any heightwise movement except in the region of the or each presser raising and lowering station S'.

In the embodiment of the invention illustrated in all but FIGS. 11 and 12, each presser 8, in addition to being furnished with a single patterning butt 9 or 9', is also provided on the front of its stem with a full complement of equally spaced height selection butts 15 (which are shorter in length than the patterning butt to prevent them from being engaged by the rotary discs 10), and at the or each presser raising and lowering station S' there are provided two oppositely sloping cams, viz an upwardly sloping presser raising cam 16 for engagement with the undersides of any height selection butts 15 presented to it, and a downwardly sloping depresser cam 17 for engagement with the upper edges of presented height selection butts. These two cams 16 and 17 are movable radially under pattern control and each is projectible inwardly into an operative position (see cam 16 in FIG. 2) and inwardly retractible into an inoperative position (see cam 17 in same figure). The pitch of the regularly spaced height selection butts 15 is judiciously determined to correspond exactly with the vertical distance necessary to raise or lower the single patterning butt of a presser from a horizontal plane in which it is acted upon by peripheral teeth 10a of one rotary disc 10 to another horizontal plane in which it can be acted upon by the next relevant disc in the predetermined sequence; the height selection butt pitch therefore also corresponds with one step or increment in the progressive sequential movements of a presser.

The aforementioned means for supporting pressers 8 and locking them against heightwise movement consist, in the illustrated example, of a horizontally disposed fixed guide ring or annulus 18 which surrounds the complete circular series of pressers, in the manner shown in FIG 3 is suitably gapped as at G at the or each presser raising and lowering station S' to permit of pressers 8 being freely driven upwards or pressed downwards at the said station, and is provided with horizontal height selection butt engaging surfaces 18a, 18b, 18c and 18d. The presser raising and depressor cams 16 and 17 at the or each relevant station S' are located adjacent to the gap G, or the appropriate gap, in the guide ring or annulus. The arrangement is, in fact, such that each time a presser 8 is shifted upwards or downwards to the extent of the pitch of the height selection butts 15 thereon, one or more of the latter will as a matter of course be disposed for immediate engagement by vertically spaced horizontal surfaces on the guide ring or annulus 18 and will remain in such engagement to lock the presser against heightwise displacement until the said engaged butt or butts, by virtue of rotation of the needle cylinder 1 relatively to the fixed guide ring or annulus 18, next moves or move into the gap G, or the next gap, as the case may be.

The gapped guide ring or annulus 18 is of uniform thickness (heightwise) throughout to correspond with the distance d (FIG. 7) between the lower edge of one height selection butt 15 on a presser 8 and the upper edge of the next but one lower height selection butt on the same presser. The upper and lower surfaces 18a and 18d respectively of the ring or annulus 18 are flat and in spaced horizontal planes. The inner wall surface of the said ring or annulus has formed therein a channel or track 18e of a uniform vertical dimension corresponding with the heightwise distance d' (FIG. 7) between the upper edge of any one height selection butt 15 on a presser 8 and the lower edge of the next lower height selection butt.

As will be seen in the arrangement illustrated in FIGS. 6 and 8, wherein at the pressure raising and lowering station S' there is only one upwardly sloping pressure raising cam 16 and one downwardly sloping depressor cam 17, the upper edge of the cam 16 is coincident with the horizontal lower surface 18c of the channel or track 18e in the ring or annulus 18 whereas the lower edge of the cam 17 is coincident with the upper side 19a of a short subsidiary horizontal track 19 adapted to receive and position a height selection butt 15 at a height midway between the upper and lower surfaces 18b and 18c of the channel or track 18e (see the butt 15' in each of FIGS. 9 and 10). Thus, whenever the raising cam 16 is operative, i.e., projected into its inner position, it shifts each relevant presser 8 upwards to a position in which two successive ones of its height selection butts (e.g., $15^2$ and $15^3$ in FIG. 7) are disposed for engagement by the horizontal upper and lower surfaces 18b and 18c of the channel or track 18e. On the other hand, whenever the depressor cam 17 is projected inwardly into its operative position, it shifts each relevant presser 8 downwards to a position in which two of its height selection butts (e.g., $15^4$ and $15^5$ respectively above and below the butt 15') span and engage the upper and lower surfaces 18a and 18d of the guide ring or ananulus 18.

Assuming now for convenience of description that there is only one presser raising and lowering station S' on the machine: then, with the presser raising cam 16 in its operative position and the depressor cam 17 withdrawn, as in FIG. 7, all of the pressers 8 will be similarly raised seriatim in a progressive sequence. Thus, each presser in turn will be raised one step or increment each time it passes by the raising and lowering station S', i.e., at each revolution of the machine, successively higher pairs of height selection butts 15 on the presser engaging the upper and lower horizontal surfaces 18b and 18c of the channel or track 18e in the guide ring or annulus 18, revolution after revolution of the machine, to lock the presser in the higher position to which it is raised each time. As a consequence of this normal progressive upward "spiralling" movement of each presser in turn, the single patterning butt 9 or 9' on the presser will be incrementally raised to such heights as to enable the said butt to be acted upon by the even numbered, i.e., the second, fourth, sixth, eighth and so on, rotary discs 10 upwards from the bottom of the pile or stack. But with the presser raising cam 16 withdrawn and the depressor cam 17 projected into its operative position, all of the pressers will be lowered scriatim in a progressive sequence but this time each presser will be locked in the lower position to which it is depressed during each revolution of the machine by virtue of the relevant ones of its height selection butts spanning and engaging the upper and lower surfaces 18a and 18d of the guide ring or annulus 18. As a result of such normal downward progression of each presser in turn, the single patterning butt thereon will be incrementally lowered to such heightwise positions as to enable it to be acted upon by the odd numbered rotary disc 10 of the same pile or stack.

To quote one specific and simple layout (not illustrated); if in a coarse gauge machine there are eighteen superimposed rotary discs 10 in the pile or stack, and each presser 8 is furnished at its lower end with a single, long patterning butt and with nine relatively short height selection butts 15 then, with the presser raising cam 16 in, the patterning butt of each presser as the latter is moved progressively upwards from its lowest position will be acted upon by peripheral teeth 10a on the 2nd, 4th, 6th, 8th, 10th, 12th, 14th, 16th and 18th successively higher rotary discs. After thereupon changing over the cams so that the raising cam 16 is withdrawn and the depressor cam 17 is projected into its operative position, the patterning butt of each presser 8 in turn as the latter is moved progressively downwards from its highest to its lowest position will be acted upon by peripheral formations of the 17th, 15th, 13th, 11th, 9th, 7th, 5th, 3rd and 1st rotary disc.

However, in a fine gauge machine the pitch or spacing of the needles or other elements to be controlled or influenced and hence also of their pressers is too fine to enable peripheral formations on the rotary discs to be correspondingly pitched. To obviate this difficulty, alternate pressers may have their single patterning butts at one height whilst the intervening pressers have their corresponding butts at a slightly different height, in which instance the rotary discs in the pile or stack may be arranged in superimposed pairs, the upper and lower discs of each pair being so relatively arranged angularly as to complement one another inasmuch as the pitch of the peripheral formations on either one of the said pair of discs can be coarser than the pitch of the patterning butts, the peripheral formations on the set of rotary discs located in the upper positions of the pairs being adapted to act on patterning butts of the alternate pressers and the formations on the set of discs located in the lower positions of the pairs being adapted to act on the patterning butts on the intervening pressers. Such an arrangement is illustrated in FIGS. 1, 3 and 6–12 wherein the alternate ones of the pressers 8 have their single patterning butts 9 at one height whilst the intervening pressers have their corresponding butts 9' at a lower height immediately below. Moreover, and as illustrated in FIG. 1, the rotary discs 10 are arranged in superimposed pairs such as those indicated by the reference letters a, b, c, d, e, f, g, h, i, j, and so on, upwards. Thus, referring to FIG. 1 it will be seen that the particular pressure 8 fully shown therein has a single patterning butt 9 which has just been acted upon and pushed in by a tooth 10a of the upper disc of the pair j whilst the lower patterning butt 9' of the next presser (a portion only of which can be seen) has not been acted upon by a tooth of the lower disc of the same pair as a consequence of which the said next presser is not pushed in. With an arrangement such as that just described the hereinbefore quoted specific layout would be modified to comprise, as shown in FIG. 1, thirty-six instead of eighteen superimposed discs 10 so that the relative proportion of discs to height selection butts 15 would then be 4:1 as against 2:1. This relative proportion may, within the scope of the invention, be still further varied as, for example, by arranging the rotary discs in threes and providing single patterning butts at three different heights on the pressers.

Again, if a certain pattern is to be mirror repeated, i.e. so that both halves of the pattern at respectively opposite sides of a median line are identical in the sense of being "reflections" of one another, then the variable presser moving means may be so actuated as to ensure that the patterning butt of each of the pressers concerned is acted upon by the same rotary discs both during the upward and also the downward progression of the presser. Thus, for instance, if during the upward progression of a presser the patterning butt thereof is acted upon sequentially by alternate ones of the rotary discs, then a mirror repeat will result only by causing the said patterning butt to be acted upon by these same alternate discs —but, of course, in the reverse order, during the subsequent downward progression of the presser. To achieve these particular upward and downward progressions of a presser, there are provided at the or each presser raising and lowering station S', as shown in FIGS. 11 and 12, two circumferentially spaced upwardly sloping presser raising cams 20 and 21 and two similarly spaced downwardly sloping depressor cams 22 and 23. The raising cams 20 and 21 are rendered operative alternately during upward movements of pressers, whereas the two depressor cams 22 and 23 are likewise rendered operative alternately during downward movements of the pressers. The upper edge of the first raising cam 20 is coincident with the lower side 19b of the short subsidiary horizontal track 19 adapted to receive and position a height selection butt 15 at a height midway between the horizontal upper and lower surfaces 18b and 18c of the channel or track 18e formed in the inner wall of the guide ring or annulus 18. The upper edge of the second raising cam 21 is coincident with the lower horizontal surface 18c of the said channel or track 18e. The lower edge of the first depressor cam 22 coincides with the upper side 19a of the subsidiary track 19, and the lower edge of the second depressor cam coincides with the upper horizontal surface 18b of the channel or track 18e.

It is also possible, by appropriate actuation of the variable presser moving means at desired times, to vary patterns still further by presenting the single patterning butts of successive pressers sequentially to a predetermined proportion only of the rotary discs. That is to say, instead of being progressively moved upwards and downwards in such a way as to cover the full range of the pile or stack of rotary discs, upward and downward progressions of pressers to lesser and variable extents may, if desired, be effected.

Again, by appropriate actuation of the variable presser moving means, the single patterning butt of each of desired pressers can be continuously presented throughout a desired period of time opposite to the periphery of one and the same rotary disc.

The manner in which the presser raising and lowering cams 16 and 17 are both mounted and moved radially into their operative and inoperative positions under pattern control will now be described with reference to FIGS. 2, 4 and 5. The raising cam 16 is provided on the leading end of a carrier slide 24 which is linearly movable back and forth radially. Similarly, the depressor cam 17 is provided on the leading end of a likewise movable carrier slide 25. These two slides are mounted in a fixed bracket 26 and are in the nature of opposed racks inasmuch as the upper side of the lower slide 24 and the underside of the upper slide 25 are formed with opposed series of rack teeth 27 and 27' respectively. A pinion 28, rotatably mounted on the bracket 26, is arranged in mesh with these two series of teeth to complete a rack and pinion mechanism. Accordingly, whenever either of the carrier slides is pushed radially inwards towards the needle cylinder 1 to render the relevant cam operative, the other slide by operation of the rack and pinion mechanism, will be automatically retracted away from the cylinder to render the cam carried thereby inoperative. This will be appreciated by comparing FIG. 2, in which the cam 16 is in and the cam 17 is out, with FIG. 4 in which the cam 16 is out and the cam 17 is in. The tail, i.e. outer ends of the said two carrier slides 24 and 25 have screwed thereinto adjustable abutment screws 29 and 30 respectively. For pushing these slides inwards at appropriate times, determined by a pattern control band 31, there are provided two bell crank levers 32 and 33 the upwardly directed arms 32a and 33a of which are arranged for action (when the levers, as viewed in FIG. 2, are turned clockwise) upon the heads of the abutment screws 29 and 30 respectively. The bell crank levers are mounted to turn about a fulcrum pin 34 set in a bracket 35, and are provided with outwardly or rearwardly directed arms 32b and 33b having lower downwardly sloping edges 32c and 33c. Set in and disposed transversely of the bracket 35 is a stop pin 36 adapted to determine the inoperative positons of the bell crank levers 32 and 33 by contact of said pin with the downwardly sloping edges 32c and 33c. That is to say, whenever either of the cam carrier slides is automatically retracted (by virtue of the companion slide being positively moved forwards to project its cam into the operative position), the relevant abutment screw will push back the upwardly directed arm of the corresponding bell crank lever, thereby turning the latter anti-clockwise until it is arrested by contact of the downwardly sloping edge of its other arm with the stop pin 36. Conversely, whenever a bell crank lever is turned in a clockwise direction, its downwardly sloping edge will move away a small distance from the said stop pin. The upper ends of the upwardly directed arms 32a and 33a are formed with lateral extensions for action on the abutment screws 29, 30, these extensions being of different lengths to compensate for the fact that whilst the bell crank levers are separated—laterally or axially—the abutment screws are disposed one immediately beneath the other.

For turning the bell crank levers 32 and 33 alternately clockwise to render the cams 16 and 17 operative alternately, at times dictated by the band 31, there are provided two actuators 37 and 38 having tapered noses 37a and 38a for engagement respectively with the downwardly sloping edges 32c and 33c. At their tail ends the actuators 37 and 38 have pin and slot connections 39, 40 with the bracket 35, these connections enabling each of the actuators to be both moved forwardly and rearwardly and also swung upwardly and downwardly about the pin 39. The underside of each actuator, moreover, is recessed at 41 near its forward end to provide an edge 41a for contact with a fixed transverse support pin 42. The forward end of each recess 41 is constituted by the back of a downwardly directed protuberance 41b. Intermediate its opposite ends, each of the two actuators 37 and 38 is formed with bearings for a slim, vertically disposed feeler 43 which is urged downwardly by a small compression spring 44 arranged as shown. A tension spring 45 serves to draw each of the actuators rearwardly and thereby restore it to its normal inoperative position. Whenever it is released, in a manner presently to be described, after having first been moved forwardly against the spring action.

The lower extremities of the spring-influenced feelers 43 contact the surface of the pattern control band 31 which is mounted upon a sprocket-like drum 46. This drum, which is adapted to be continuously racked round step by step by pawl and ratchet mechanism such as that indicated at 47, 48, 49 has formed in its periphery a circular series of regularly spaced transverse grooves 46a. A circular series of regularly spaced sprocket teeth or pins 46b provided on the drum 46 between the grooves 46a engage holes 31a formed in the band 31 suchwise as to effect intermittent advancement of the latter. In this connection, since the pawl arm 49 is arranged to be acted upon by an adjustable abutment screw 50 carried by a reciprocatory slide 51 driven outwards by a cam 52 turning with the needle cylinder 1, the pattern control band 31 is intermittently advanced in time with the rotation of the said cylinder. The band 31 is also formed with two series of holes 31b and 31c pre-arranged in accordance with pattern requirements. As the band passes around the drum 46, the holes 31b and 31c register with transverse grooves 46a. Thus, whenever a hole comes opposite to one of the feelers 43 the latter will pass through this hole into a transverse groove in the drum 46. As a consequence, a driving connection between the drum 46 and the relevant one of the actuators 37 and 38 is established. As the said drum turns to the extent of one step, therefore, the actuator will be driven forwards to act on and turn the corresponding bell crank lever clockwise with the result already described. To effect release of a feeler 43 from engagement with a groove in the drum by swinging the relevant actuator up clear of the band 31 thereby permitting return of the said actuator to its inoperative position under spring action at the appropriate time there is provided an oscillatory release member 53 having an arm 53a for contact with the aforementioned protuberances 41b. The release member is mounted to turn about the fulcrum pin 34 and is controlled by a tension spring 54. A downwardly directed extension 53b of the member 53 is arranged to be acted upon by an adjustable abutment screw 55 provided on a second reciprocatory slide 56 which is adapted to be actuated by a cam 57 revolving with the cylinder 1.

At 58 is indicated a comb for accurately spacing apart and guiding the bell crank levers 32 and 33 and the actuators 37 and 38 therefor.

If garment lengths or other articles are to be produced on the machine in strings, then to assist in a rapid return to the start of a new pattern after the termination of one garment length or article in readiness for commencement of the next, the machine may be equipped with a plurality of return stations at all of which are provided depressor cams to act on pressers. Depending on the particular arrangement adopted, pressers can be returned to their lowest, i.e. starting, positions in a few revolutions as against a substantially larger number of revolutions of the machine.

I claim:

1. In a circular knitting machine, in combination; a cylindrical rotary bed having formed therein a circular series of axial grooves; individually movable elements mounted in said grooves, said elements being furnished with control butts and, in addition to being movable lengthwise, having the portions thereof provided with the butts capable of radial movements selectively towards and away from the axis of said cylindrical bed; cam means for acting on said control butts to move the elements lengthwise, the butts being presented to or caused to miss the cam means depending on the selective radial movements of the butted portions of the elements; pressers arranged in the same grooves as and in front of the elements to be controlled, there being one presser to each element and the stem of each presser being furnished with a single patterning butt; a stack of co-adjacent rotary discs which are fixed so far as any movements thereof towards and away from the pressers are concerned, said discs having thereon prearranged peripheral formations for action on the patterning butts for the purpose of pressing the pressers and hence also the corresponding elements to be controlled radially inwards into their grooves; [and] variable presser moving means for sequentially shifting the pressers longitudinally upwards and downwards *at a height selection station* to dispose their single patterning butts opposite to the peripheries of predetermined discs, *and means for locking said pressers against longitudinal movement except at a height selection station, said locking means comprising a series of height locating butts on each of said pressers and a rigid locking ring which extends circumferentially of said cylindrical rotary bed and is engageable by height locating butts of said pressers, said height locating butts engaging said locking ring except at a height selection station to lock said pressers against longitudinal movement and being disengaged from said locking ring at a height selection station to permit longitudinal movement of said pressers by said presser moving means.*

2. A combination as claimed in claim 1, wherein the arrangement of the variable presser moving means is such that successive pressers can be moved seriatim first longitudinally upwards in steps of predetermined equal extents, to dispose their single patterning butts opposite to the peripheries of successively higher rotary discs in the pile, whereupon such pressers can be similarly moved longitudinally downwards in like steps to dispose the said single patterning butts opposite to successively lower discs, or vice versa.

3. A combination as claimed in claim 1, wherein the arrangement of the variable presser moving means is such that each presser is incrementally moved upwards at desired times in a strict sequence so that its single patterning butt is acted upon first by the lowest rotary disc in the pile, then by the next higher disc, and so on, disc by disc to the top disc in the pile, after which the presser is reversed in direction and incrementally moved downwards so that its patterning butt is acted upon by successively lower discs in turn.

4. A combination as claimed in claim 1, wherein the variable presser moving means are such that each presser is moved in such increments that between upward movements thereof each to the same extent its single patterning butt will be acted upon by alternate rotary discs, whereas between intermittent downward movements of the same presser, the said patterning butt will be acted upon by the intervening rotary discs in the pile, and so on, whereby the same pattern is continuously repeated.

5. A combination as claimed in claim 1, wherein the variable presser moving means are so actuable as to ensure that the single patterning butt of each of the pressers is acted upon by the same rotary disc both during the upward and also the downward progression of the presser, whereby the pattern is mirror repeated in the sense herein defined.

6. A combination as claimed in claim 1, wherein the variable presser moving means are so actuable at desired times that the single patterning butt of each of successive pressers is presented sequentially to a predetermined proportion only of the rotary discs.

7. A combination as claimed in claim 1, wherein by appropriate actuation of the variable presser moving means the single patterning butt of each of desired pressers can be continuously presented throughout a desired period of time opposite to the periphery of one and the same rotary disc.

8. A circular knitting machine which includes, in combination, a cylindrical rotary bed having formed therein a circular series of axial grooves; individually movable elements mounted in said grooves, said elements being furnished with control butts and, in addition to being movable lengthwise, having the portions thereof provided with the butts capable of radial movements selectively towards and away from the axis of said cylindrical bed; cam means for acting on said control butts to move the elements lengthwise, the butts being presented to or caused to miss the cam means depending on the selective radial movements of the butted portions of the elements; pressers arranged in the same grooves as and in front of the elements to be controlled, there being one presser to each element and the stem of each presser being furnished with a single patterning butt; a stack of co-adjacent rotary discs which are fixed so far as any movements thereof towards and away from the pressers are concerned, said discs having thereon prearranged peripheral formations for action on the patterning butts for the purpose of pressing the pressers and hence also the corresponding elements to be controlled radially inwards into their grooves; [and] variable presser moving means for sequentially shifting the pressers longitudinally upwards and downwards to dispose their single patterning butts opposite to the peripheries of predetermined discs, the pressers being raised and lowered sequentially at a *height selection* station in advance of an element selecting station at which latter pressers, and hence also the corresponding elements to be controlled, are selectively pressed back into their grooves by peripheral formations on rotary discs, *and means for locking said pressers against longitudinal movement except at a height selection station, said locking means comprising a series of height locating butts on each of said pressers and co-operating ring means which extends circumferentially of said cylindrical rotary bed and engages said height locating butts to lock said pressers against longitudinal movement except at a height selection station, said ring means having a gap at said height selection station permitting release of said pressers for longitudinal movement of said pressers by said presser moving means.*

9. In a cylindrical knitting machine, in combination: a cylindrical rotary bed having formed therein a circular series of axial grooves; individually movable elements mounted in said grooves, said elements being furnished with control butts and, in addition to being movable lengthwise, having the portions thereof provided with the butts capable of radial movements selectively towards and away from the axis of said cylindrical bed; cam means for acting on said control butts to move the elements lengthwise, the butts being presented to or caused to miss the cam means depending on the selective radial movements of the butted portions of the elements; pressers arranged in the same grooves as and in front of the elements to be controlled, there being one presser to each element and the stem of each presser being furnished with a single patterning butt; a stack of co-adjacent rotary discs which are fixed so far as any movements thereof towards and away from the pressers are concerned, said discs having therein prearranged peripheral formations for action on the patterning butts for the purpose of pressing the pressers and hence also the corresponding elements to be controlled radially inwards into their grooves; variable presser moving means for sequentially shifting the pressers longitudinally upwards and downwards to dispose their single patterning butts opposite to the peripheries of predetermined discs, the pressers being raised and lowered sequentially at a station in advance of an element selecting station at which latter pressers, and hence also the corresponding elements to be controlled, are selectively pressed back into their grooves by peripheral formations on rotary discs, and means for supporting pressers and locking them against any heightwise movement except in the region of the presser raising and lowering station, the said means being thereby adapted, in regard to any presser which at such station has been longitudinally shifted up or down to the extent of one step, to maintain said presser at the height to which it has been so moved until next required to be shifted up or down.

10. A combination according to claim 9, wherein each of the pressers, in addition to being formed with a single patterning butt, also has on the stem a full complement of height selection butts, and the means for supporting pressers and locking them against heightwise movement except in the region where pressers are raised and lowered consists of a horizontally disposed fixed guide ring which surrounds the circular series of pressers, has therein a gap at a presser raising and lowering location to permit of pressers being freely driven upwards or pressed downwards at the said location, and is provided with horizontal height selection butt engaging surfaces.

11. A circular knitting machine which includes in combination; a cylindrical rotary bed having formed therein a circular series of axial grooves; individually movable elements mounted in said grooves, said elements being furnished with control butts and, in addition to being movable lengthwise, having the portions thereof provided with the butts capable of radial movements selectively towards and away from the axis of said cylindrical bed; cam means for acting on said control butts to move the elements lengthwise, the butts being presented to or caused to miss the cam means depending on the selective radial movement of the butted portions of the elements; pressers arranged in the same grooves as and in front of the elements to be controlled, there being one presser to each element and the stem of each presser being furnished with a single patterning butt, and with a full complement of equally spaced height selection butts; a stack of co-adjacent rotary discs which are fixed so far as any movements thereof towards and away from the pressers are concerned, said discs having thereon prearranged peripheral formations for action on the patterning butts for the purpose of pressing the pressers and hence also the corresponding elements to be controlled radially inwards into their grooves; variable presser moving means in the form of at least one upwardly sloping and radially movable presser raising cam for engagement with the undersides of any height selection butts presented to it and at least one downwardly sloping and radially movable depressor cam for engagement with the upper edges of presented height selection butts; and [ patterns ] *pattern* controlled means for radially moving these sloping cams each of which latter is projectible inwardly into an operative position and outwardly retractible into an inoperative position whereby the pressers can be sequentially shifted longitudinally upwards and downwards to dispose their single patterning butts opposite to the peripheries of predetermined rotary discs, the pressers being raised and lowered sequentially at a station in advance of an element selection station at which latter pressers, and hence also the corresponding elements to be controlled, are selectively pressed back into their grooves by peripheral formations on rotary discs, and the pitch of the height selection butts corresponding with the vertical distance necessary to raise or lower the single patterning butt of a presser from a plane in which it is acted upon by the peripheral formations of one rotary disc to another plane in which it can be acted upon by the next relevant disc in the predetermined sequence.

12. A circular knitting machine which includes, in combination; a cylindrical rotary bed having formed therein a circular series of axial grooves; individually movable elements mounted in said grooves, said elements being furnished with control butts and, in addition to being movable lengthwise, having the portions thereof provided with the butts capable of radial movements selectively towards and away from the axis of said cylindrical bed; cam means for action on said control butts to move the elements lengthwise, the butts being presented to or caused to miss the cam means depending on the selective radial movements of the butted portions of the elements; pressers arranged in the same grooves as and in front of the elements to be controlled, there being one presser to each element and the stem of each presser being furnished with a single patterning butt and with a full complement of equally spaced height selection butts; a stack of co-adjacent rotary discs which are fixed so far as any movements thereof towards and away from the pressers are concerned, said discs having thereon prearranged peripheral formations for action on the patterning butts for the purpose of pressing the pressers and hence also the corresponding elements to be controlled radially inwards into their grooves; variable presser moving means in the form of at least one upwardly sloping and radially movable presser raising cam for engagement with the undersides of any height selection butts presented to it and at least one downwardly sloping and radially movable depressor cam for engagement with the upper edges of presented height selection butts; patterned controlled means for radially moving these sloping cams each of which latter is projectible inwardly into an operative position and outwardly retractible into an inoperative position whereby the pressers can be sequentially shifted longitudinally upwards and downwards to dispose their single patterning butts opposite to the peripheries of predetermined rotary discs, the pressers being raised and lowered sequentially at a station in advance of an element selecting station at which latter pressers, and hence also the corresponding elements to be controlled, are selectively pressed back into their grooves by peripheral formations on rotary discs, and the pitch of the height selection butts corresponding with the vertical distance necessary to raise or lower the single patterning butt of a presser from a plane in which it is acted upon by the peripheral formations of one rotary disc to another plane in which it can be acted upon by the next relevant disc in the predetermined sequence, and a horizontally disposed fixed guide ring for supporting pressers and locking them against heightwise movement except in the region where pressers are raised and lowered, said ring surrounding the circular series of pressers, having therein a gap at the presser raising and lowering station to permit of pressers being freely driven upwards or pressed downwards at the said station and being provided with horizontal height selection butt engaging surfaces.

13. A circular knitting machine according to claim 12, wherein the presser raising and depressor cams at the relevant station are located adjacent to the gap in the guide ring, the arrangement being such that each time a presser is shifted upwards or downwards to the extent of the pitch of the height selection butts thereon, one or more of these butts will as a matter of course be disposed for immediate engagement by vertically spaced horizontal surfaces on the guide ring and will remain in such engagement to lock the presser against heightwise displacement until the said engaged butt or butts, by virtue of rotation of the cylindrical rotary bed to the fixed guide ring next moves or move into the gap.

14. A circular knitting machine according to claim 12, wherein the gapped guide ring is of uniform thickness (heightwise) throughout to correspond with the distance between the lower edge of one height selection butt on a presser and the upper edge of the next but one lower height selection butt on the same presser, the upper and lower surfaces of the ring being flat and in spaced horizontal planes, and the inner wall surface of the said ring having formed therein a channel of a uniform vertical dimension corresponding with the heightwise distance between the upper edge of any one height selection butt on the presser and the lower edge of the next lower height selection butt.

15. A circular knitting machine according to claim 14, wherein the upper edge of the presser raising cam is coincident with the horizontal lower surface of the channel in the guide ring so that whenever said raising cam is operative it shifts each relevant presser upwards to a position in which two successive ones of its height selection butts are disposed for engagement by the horizontal upper and lower surfaces of the said channel, whereas the lower edge of the depressor cam is coincident with the upper side of a short subsidiary horizontal track adapted to receive and position a height selection butt at a height midway between the upper and lower surfaces of the aforesaid channel whereby whenever the depressor cam is operative it shifts each relevant presser downward to a position in which two of its height selection butts (one above and the other below the last mentioned height selection butt) span and engage the upper and lower surfaces of the guide ring.

16. A circular knitting machine according to claim 15, wherein with the presser raising cam in its operative position and the depressor cam withdrawn at the presser raising and lowering station, each presser in turn is raised one step each time it passes by the said station, successively higher pairs of height selection butts on the presser engaging the upper and lower horizontal surfaces of the channel in the guide ring, revolution after revolution of the machine, to lock the presser in the higher position to which it is raised each time, the single patterning butt on the presser as a consequence being incrementally raised to such heights as to enable the said butt to be acted upon by the even numbered rotary discs upwards from the bottom of the stack, whereas with the presser raising cam withdrawn and the depressor cam projected into its operative position each presser will be locked in the lower position to which it is depressed during each revolution of the machine by virtue of the relevant ones of its height selection butts spanning and engaging the upper and lower surfaces of the guide ring with the result that the single patterning butt of each presser in turn is incrementally lowered to such heightwise positions as to enable it to be acted upon by the odd numbered rotary discs of the same pile or stack.

17. A circular knitting machine according to claim 12, wherein at the presser raising and lowering station there are two circumferentially spaced upwardly sloping presser raising cams and two similarly spaced downwardly sloping depressor cams, the first and second raising cams being rendered operative alternately during upward movements of pressers and the first and second depressor cams being likewise rendered operative alternately during downward movements of pressers, the upper edge of the first raising cam being coincident with the lower side of a short subsidiary horizontal track adapted to receive and position a height selection butt at a height midway between the horizontal upper and lower surfaces of the channel formed in the inner wall of the guide ring; the upper edge of the second raising cam being coincident with the lower horizontal surface of the said channel; the lower edge of the first depressor cam coinciding with the upper side of the short subsidiary track, and the lower edge of the second depressor cam coinciding with the upper horizontal surface of the aforesaid channel.

18. A fine gauge circiular knitting machine comprising, in combination; a cylindrical rotary bed having formed therein a circular series of axial grooves; individually movable elements mounted in said grooves, said elements being furnished with control butts and, in addition to being movable lengthwise, having the portions thereof provided with butts capable of radial movements selectively toward and away from the axis of said cylindrical bed; cam means for acting on said control butts to move the elements lengthwise, the butts being presented to or caused to miss the cam means depending on the selective radial movements of the butted portions of the elements; pressers arranged in the same grooves as and in front of the elements to be controlled there being one presser to each element and the stem of each presser being furnished with a single patterning butt; a stack of co-adjacent rotary discs which are fixed so far as any movements thereof towards and away from the pressers are concerned, said discs having thereon prearranged peripheral formations for action on the patterning butts for the purpose of pressing the pressers and hence also the corresponding elements to be controlled radially inwards into their grooves; [ and ] variable presser moving means for sequentially shifting the pressers longitudinally upwards and downwards *at a height selection station* to dispose their single patterning butts opposite to the peripheries of predetermined discs, alternate pressers having their single patterning butts at one height whilst the intervening pressers have their corresponding butts at a slightly different height, and the rotary discs in the stack being arranged in superimposed pairs, the upper and lower discs of each pair being so relatively arranged angularly as to complement one another inasmuch as the pitch of the peripheral formations can be coarser than the pitch of the patterning butts, the peripheral formations on the set of rotary discs located in the upper postions of the pairs being adapted to act on patterning butts of the alternate pressers and the formations on the set of discs located in the lower positions of the pairs being adapted to act on the patterning butts of the intervening pressers, *and means for locking said pressers against longitudinal movement except at a height selection station, said locking means comprising a series of height locating butts on each of said pressers and co-operating ring means which extends circumferentially of said cylindrical rotary bed and engages said height locating butts to lock said pressers against longitudinal movement except at a height selection station, said ring means having a gap at said height selection station permitting release of said pressers for longitudinal movement of said pressers by said presser moving means.*

* * * * *

UNITED STATES PATENT OFFICE

CERTIFICATE OF CORRECTION

PATENT NO. : Re. 28,528

DATED : August 26, 1975

INVENTOR(S) : Ernest L. Farmer

It is certified that error appears in the above-identified patent and that said Letters Patent are hereby corrected as shown below:

On the title page in column 1, after the Inventor is listed and before Filed, please insert:

Assignee: WILDT MELLOR BROMLEY LIMITED, Leicester, England, a British Company

Signed and Sealed this

*eighth* Day of *June 1976*

[SEAL]

*Attest:*

RUTH C. MASON
*Attesting Officer*

C. MARSHALL DANN
*Commissioner of Patents and Trademarks*